United States Patent
Potanin et al.

(10) Patent No.: US 8,665,668 B2
(45) Date of Patent: Mar. 4, 2014

(54) ULTRASONIC DISTANCE MEASUREMENT CONTROLLER

(75) Inventors: Vladislav Potanin, San Jose, CA (US); Alexander Burinskiy, San Jose, CA (US); Elena Potanina, San Jose, CA (US)

(73) Assignee: Vivid Engineering, Inc., San Jose, CA (US)

( * ) Notice: Subject to any disclaimer, the term of this patent is extended or adjusted under 35 U.S.C. 154(b) by 336 days.

(21) Appl. No.: 13/231,159

(22) Filed: Sep. 13, 2011

(65) Prior Publication Data

US 2012/0069712 A1   Mar. 22, 2012

Related U.S. Application Data

(60) Provisional application No. 61/384,003, filed on Sep. 17, 2010.

(51) Int. Cl.
*G01S 15/08* (2006.01)
(52) U.S. Cl.
USPC .............................................. 367/98; 367/99

(58) Field of Classification Search
USPC ..................................................... 367/98, 99
See application file for complete search history.

(56) References Cited

U.S. PATENT DOCUMENTS

2012/0069712 A1*  3/2012  Potanin et al. ................. 367/98

* cited by examiner

*Primary Examiner* — Daniel Pihulic
(74) *Attorney, Agent, or Firm* — Turk IP Law, LLC (57) ABSTRACT

Technologies are generally described for an integrated circuit that is designed to serve as the basis of SONAR sensors that provide high sensitivity, low noise, low cost, and electronically adjustable gain in a small package may incorporate transducer drivers and signal sensing functions. Electronically programmable gain of the circuit may provide flexibility in system designs for gain management, and eliminate a need for manual gain adjustments in production. Power may be supplied to the sensor(s) over a power line of the circuit from a direct current source through a resistor. The same line may also be used for communicating with the sensor(s). Data from the microcontroller may be transmitted to the sensor(s) using an open-drain driver transistor and received through another transistor isolating the micro-controller's input from potentially high voltages present on the power line.

20 Claims, 6 Drawing Sheets

ULTRASONIC DISTANCE MEASUREMENT CONTROLLER

BACKGROUND

Unless otherwise indicated herein, the materials described in this section are not prior art to the claims in this application and are not admitted to be prior art by inclusion in this section.

Ultrasonic distance measurement systems are widely used in industry and other areas such as automobiles, construction industry, surveying applications, and comparable ones. Such systems typically include electronic components to excite the piezoelectric transducer and to sense reflected signal. High-end systems may employ complex and expensive integrated circuits to perform the tasks, while less expensive solutions that are built on general purpose discrete components may not provide satisfactory performance regarding performance, price, and/or size.

Ultrasonic Sound Navigation and Ranging (SONAR) systems may typically include a central controller module and one or more sensors. The central module usually incorporates a micro-controller that excites and polls the sensors, receives and analyzes SONAR echoes, and produces visual or audio cues that indicate the presence or absence of objects, and in some cases the distance to the objects. In a typical application, each sensor may be housed in an enclosure that incorporates a ceramic transducer and electronic components to excite the transducer (to produce a "ping") and to sense the response of the same transducer to echoes.

A common and relatively inexpensive approach for SONAR applications is to build sensors from general-purpose amplifiers, discrete transistors, and other discrete components. In such an approach, the sensor amplifies and filters the transducer response, but delegates to the central controller the task of recognizing and interpreting echoes in the resulting analog signal. One challenge facing many ultrasonic SONAR systems is significant variability in transducer sensitivity resulting from manufacturing variations. If not accounted for, such variability may cause false alerts or detection failures. To compensate for variations in transducer sensitivity, sensors typically provide a means of adjusting the gain of the receiver amplifier. In simple sensors, for example, gain adjustment may be achieved by manual tuning of potentiometers.

SUMMARY

The present disclosure generally describes a controller for ultrasonic echo based distance measurement systems, where the controller includes a pair of transmitting power drivers for activating a piezoelectric transducer, a receiving sense path, a digital frequency locked loop (DFLL) for adjusting an internal clock frequency based on a rate of incoming external data flow, and an amplifier with a digital gain control.

The present disclosure also describes an ultrasonic echo based distance measurement system that includes a piezoelectric transducer configured to transmit acoustic waves in response to an electrical signal and generate another electrical signal in response to a detected acoustic wave, and a controller comprising a pair of transmitting power drivers for activating a piezoelectric transducer, a receiving sense path, a digital frequency locked loop (DFLL) for adjusting an internal clock frequency based on a rate of incoming external data flow, and an amplifier with a digital gain control. The controller may initiate a ping-echo cycle by transmitting a train of pulses over a power line of the controller to the transducer; after a burst of acoustic waves is generated by the transducer, activate the receiving sense path in order to sense the other electrical signal based on the detected acoustic wave at the transducer; amplify and filter the other electrical signal; and transmit the amplified and filtered electrical signal to a microcontroller of the ultrasonic echo based distance measurement system through one of the power line of the controller and a separate signal output.

The present disclosure further describes a method for ultrasonic echo based distance measurement that includes initiating a ping-echo cycle by transmitting a train of pulses over a power line of a controller to a transducer; after a burst of acoustic waves is generated by the transducer, activating a receiving sense path of the controller in order to sense an electrical signal based on a detected acoustic wave at the transducer; amplifying the sensed signal at a digitally programmable amplifier of the controller; filtering the amplified signal at a tunable narrow band-pass filter of the controller; and transmitting the filtered signal to a microcontroller of an ultrasonic echo based distance measurement system through one of the power line of the controller and a separate signal output.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

The foregoing and other features of this disclosure will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings, in which:

DETAILED DESCRIPTION

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented herein. It will be readily understood that the aspects of the present disclosure, as generally described herein, and illustrated in the Figures, can be arranged, substituted, combined, separated, and designed in a wide variety of different configurations, all of which are explicitly contemplated herein.

This disclosure is generally drawn, inter alia, to methods, apparatus, systems, devices, and/or computer program products related to employing a digital frequency locked loop (DFLL) based system in SONAR and similar sensor systems.

Briefly stated, an integrated circuit that is designed to serve as the basis of SONAR sensors that provide high sensitivity, low noise, low cost, and electronically adjustable gain in a small package may incorporate transducer drivers and signal sensing functions. Electronically programmable gain of the circuit may provide flexibility in system designs for gain management, and eliminate a need for manual gain adjustments in production. According some embodiments, power may be supplied to the sensor(s) over a power line of the circuit from a direct current source through a resistor. The same line may also be used for communicating with the sensor(s). Data from the microcontroller may be transmitted to the sensor(s) using an open-drain driver transistor and received through another transistor isolating the micro-controller's input from potentially high voltages present on the power line.

Figure 1:
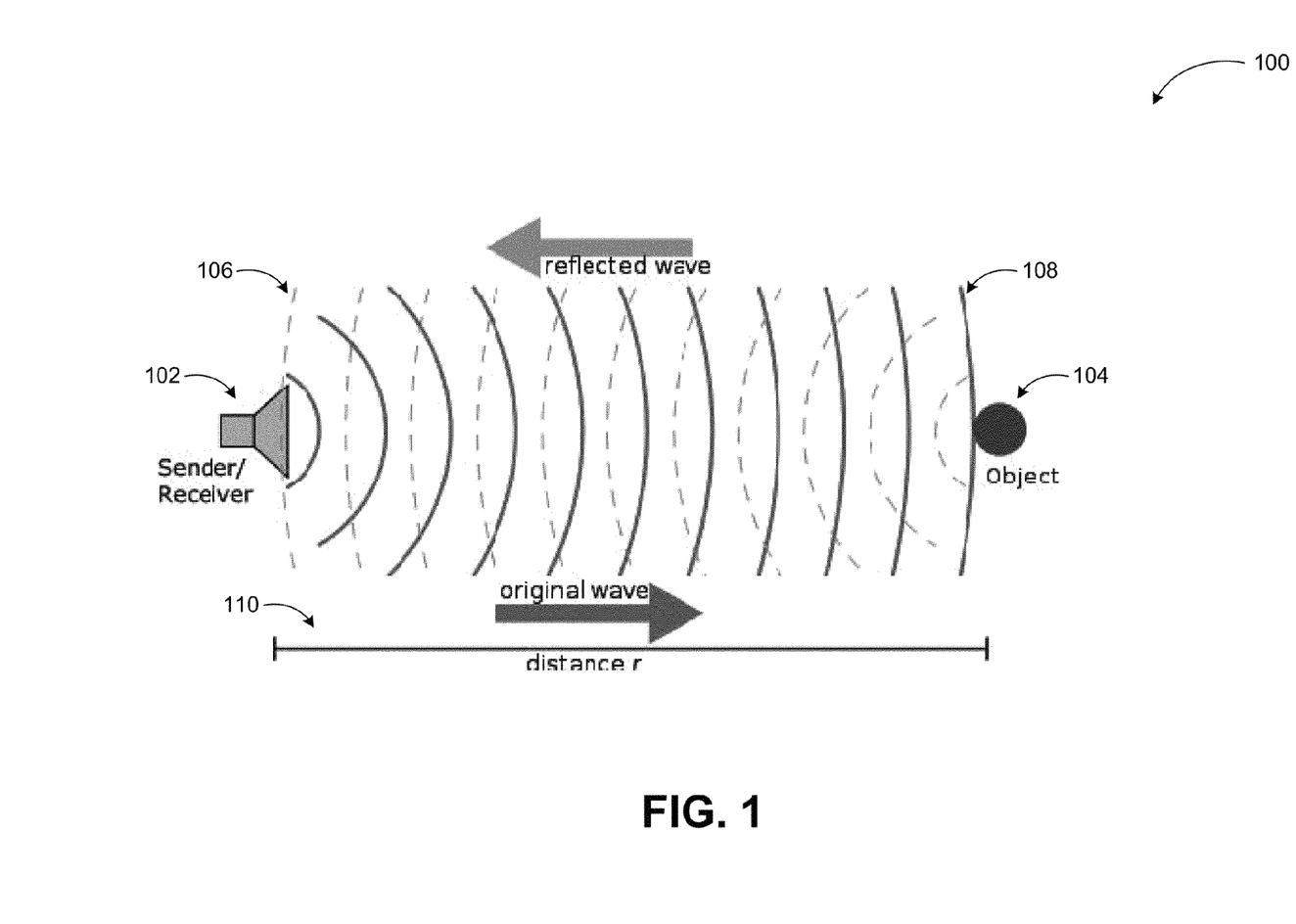
FIG. 1 illustrates a conceptual diagram of sound sensor based distance measurement.

FIG. 1 illustrates a conceptual diagram of sound sensor based distance measurement.

Ultrasonic sensors use electrical energy and a piezoelectric ceramic transducer to emit and receive mechanical energy in the form of sound waves. Sound waves are essentially pressure waves that travel through solids, liquids and gases and can be used to measure distance or detect the presence or absence of targets or obstacles as shown diagram 100. Ultrasonic sensors are used in many automated factories, process plants, surveying applications, construction industry, as well as vehicles for collision alerts and parking assistance.

Because ultrasonic sensors employ sound rather than light for detection, they may be utilized in applications where photoelectric sensors may not operate efficiently or practically. Ultrasonic detection may be employed in liquid level measurement or distance measurement in high glare environments because color, ambient light levels, and/or reflectivity do not affect the sound waves. In the conceptual example of diagram 100, sender/receiver 102 may be a sensor that transmits original wave 108, which reflects from an object 104 and returns to the sender/receiver 102 as reflected wave 106. The original wave 108 may also be referred to as "ping" and the reflected wave 106 may be referred to as "echo". By measuring a time difference between the ping and the echo, and factoring in the medium's (e.g., air) effect on the speed of sound, a system may determine the distance 110 using the interaction between the sender/receiver 102 and the object 104.

Figure 2:
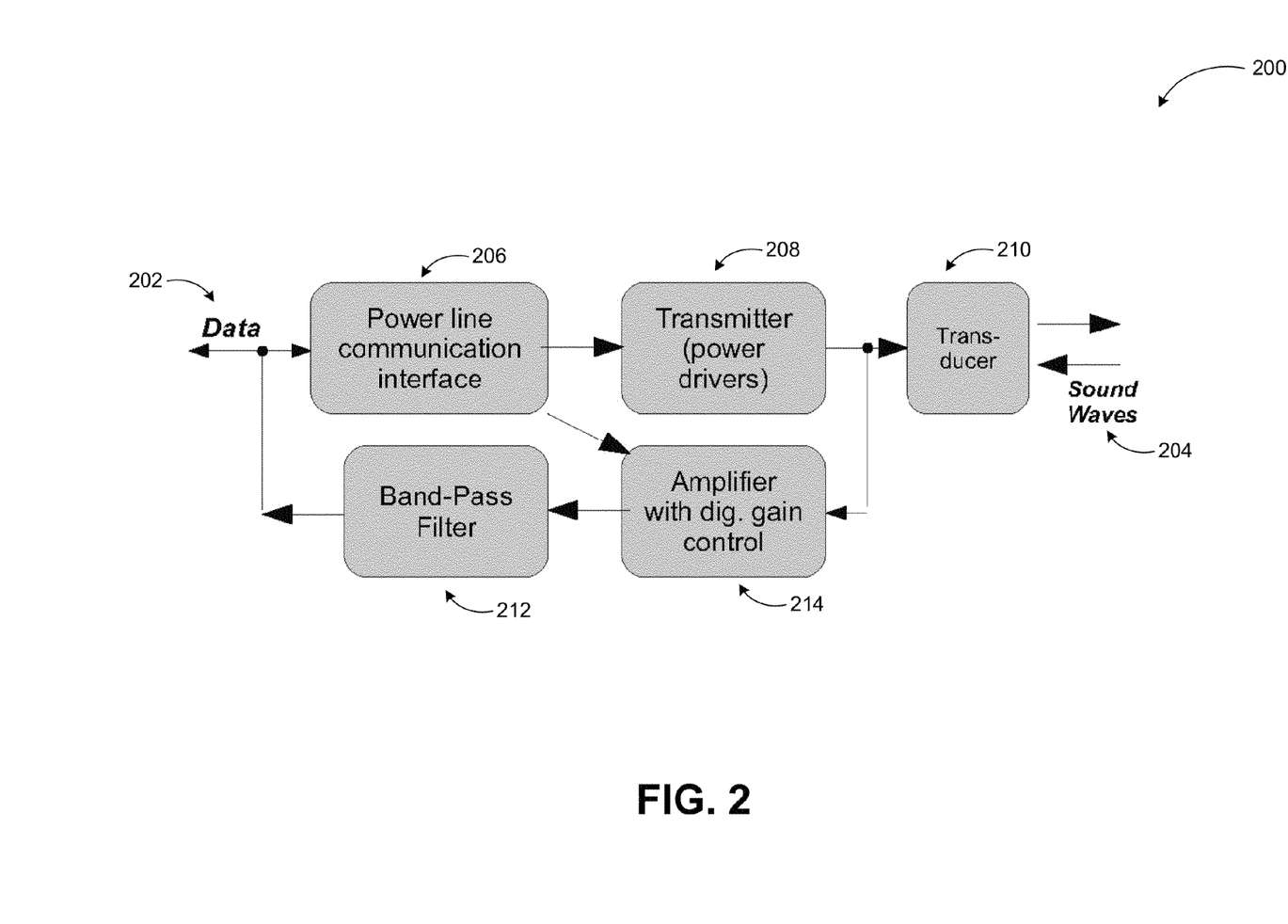
FIG. 2 illustrates a block diagram of an example SONAR sensor.

FIG. 2 illustrates a block diagram of an example SONAR sensor. While a SONAR-based sensor system may be implemented with a variety of components and configurations, an example system's major components are illustrated in diagram 200.

Distance measurement systems may use SONAR principle to determine distance to objects. SONAR sensors use electrical energy and an electromechanical transducer 210 to emit and receive mechanical energy in the form of sound waves 204. Distance to a target is calculated from the time that is required for sound waves 204 to travel from transducer 210 to a target and reflect back to the transducer 210. A sensor system according to embodiments may include transmitting power drivers 208 and receiving sense path. The sense path may include an amplifier 214 with digital gain control thus allowing signal path adaptation to various operation conditions and types of transducers.

The sensor system may incorporate also a digital communication interface for receiving and transmitting gain setting data from/to external controller. Additionally, the sense path may incorporate a tunable narrow band-pass filter 212 for improving its sensing abilities (improving signal-to-noise ratio). Because different transducers need transmitted signals to be of different frequencies, a sensor system according to embodiments may incorporate a Digital Frequency Locked Loop (DFLL) as a part of power-line communication block 206. The DFLL may address two targets: it may enable capturing of incoming data 202 and it may allow adjusting of a band-pass filter center frequency to a transmitted signal frequency.

Figure 3A:
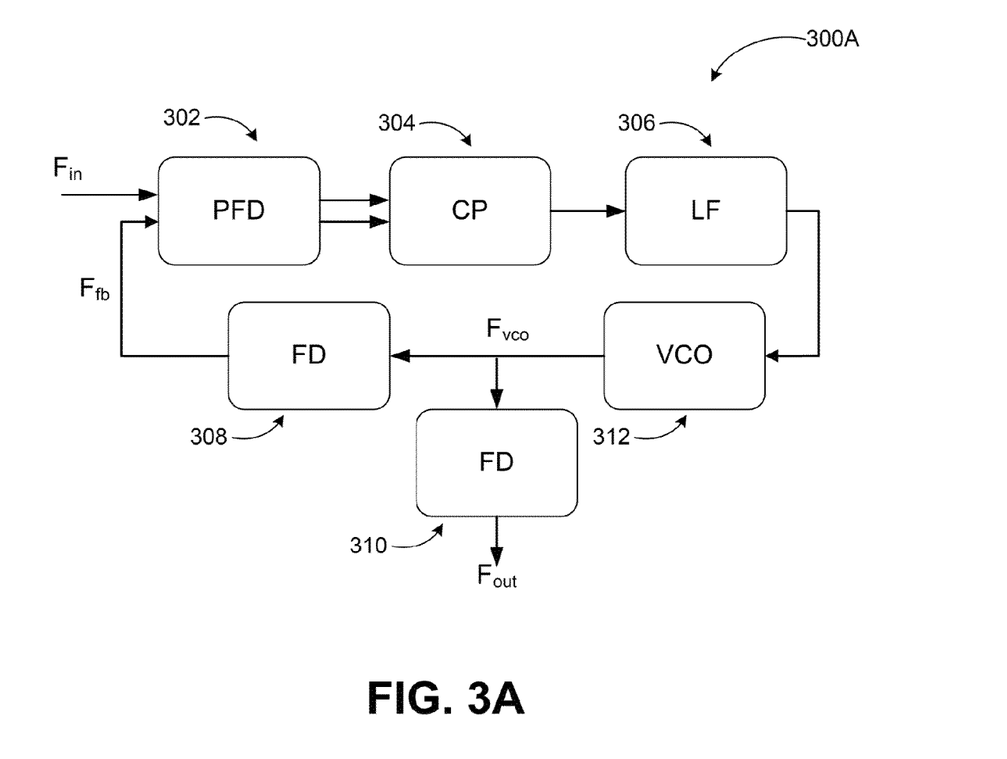
FIG. 3A illustrates a block diagram of an example conventional phase locked loop (PLL) according to some embodiments.

FIG. 3A illustrates a block diagram of an example conventional phase locked loop (PLL).

Though particular requirements may vary for different applications, a typical ultrasonic distance measurement system includes a central controller unit and one or more sensor units located in appropriate places connected with control unit by wires. Controller unit initiates measurement cycle in each sensor, measures time between ping and echo and indicates distance to the target. There are many challenges in such systems, a majority of them being related to principles of operation of ultrasonic transducer in both transmission and sensing phases of its operation. A major challenge arises from the fact that amplitude of reflected signal reduces substantially with distance. Additional complications may arise from surroundings that can create multiple echo signals. As a result, transmitting and sensing electronic components may have to be places close to transducer, often in the same enclosure. A transducer with its electronic components is referred to as sensor herein. Two major types of sensors are commonly available: sensors with an on or off digital output for detecting the presence of objects, and sensors with an analog output which varies proportionally to the sensor to target separation distance.

First type of sensors with digital output tend to be complex and expensive solutions because of the use of extensive signal processing that is needed for reliable echo detection. Such sensors are based on specially developed integrated circuits that combine transmitting power drivers, programmable gain amplifier(s), filter(s), analog-to-digital converters (ADCs), and digital signal processing logic.

Second type of sensors tend to be less expensive. They are typically built with general purpose amplifiers, discrete transistors and other discrete components. After generating a ping they send amplified and slightly filtered signal from transducer to controller board delegating task of recognizing target echo in a raw signal to controller unit. Though such solutions are less expensive, they tend to have their drawbacks. For example, variation of transducer's transmitting efficiency and sensitivity requires adjustment of a gain level in a sensing channel individually for each particular transducer. In simple sensors, the adjustment may be performed by manual tuning of potentiometers resulting in low effectiveness and high cost of production.

Traditional sensor systems employ Phase-Locked Loop (PLL) systems for adjustment of internal clock frequency rate to a rate of incoming external signal. PLL systems, such as the example system shown in diagram 300A typically include a Phase-Frequency Detector (PFD) 302, a Charge Pump (CP)

304, a Low-Pass Filter (LF) 306, a Voltage (or Current) Controlled Oscillator (VCO or CCO) 312, and one or more Frequency Dividers (FDs) 308, 310.

In a typical operation, at each incoming clock edge the PFD 302 compares and extracts time difference between incoming clock signal $f_{in}$ and the clock signal $f_{fb}$ generated by PLL. These time-difference signals control the charge pump 304, which adjusts analog signal in voltage or current form that through LF 306 adjusts the frequency generated by the VCO 312. One disadvantage of traditional PLL systems is in relatively high complexity, long locking time, and inability to work properly in systems where data are transmitted in packages with long pauses between transmissions because the output frequency $f_{out}$ may drift from signal's frequency when data stream is not present. Thus, the system needs allocation of long locking time at the beginning of each packet of data.

Figure 3B:
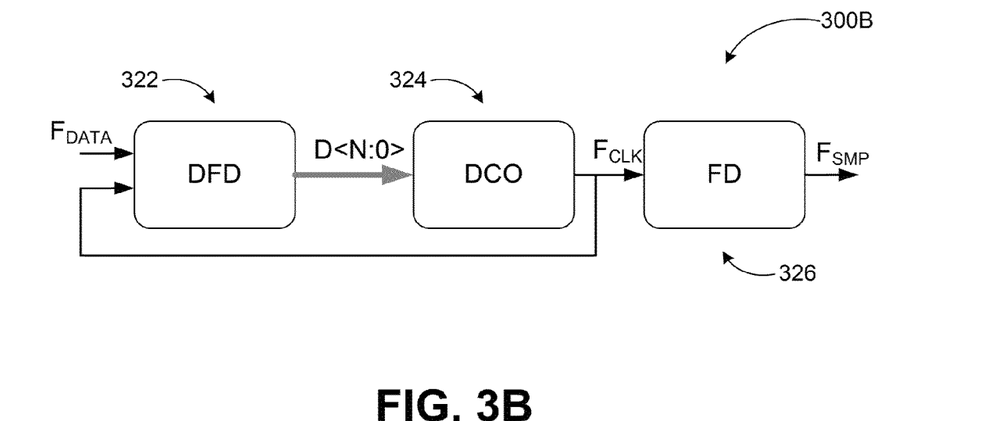
FIG. 3B illustrates a block diagram of an example digital frequency locked loop (DFLL) according to some embodiments.

FIG. 3B illustrates a block diagram of an example digital frequency locked loop (DFLL) according to some embodiments.

A Digital Frequency Locked Loop (DFLL) is a device and method that allows adjustment of internal clock frequency to the rate of incoming external data flow. It may be used for capturing the data from the input stream in absence of a clock signal aligned to the data stream. Examples of such communication schemes are one-wire, over-power-line, and wireless protocols. A DFLL according to embodiments may be advantageous for systems where data are transmitted in relatively short packages (few bytes) with long pauses between transmissions (e.g., SONAR based distance measurement systems).

A DFLL according to embodiments (as shown in diagram 300B) may incorporate a Digital Frequency Differentiator (DFD) 322, a Digitally-Controlled Oscillator (DCO) 324, and a Frequency Divider (FD) 326. Such a DFLL may support simple data-only communication protocols, where each package of data starts with fixed preamble of P bits of data that is used for adjusting internal frequency. The DFLL operation principle may be as follows: at start of each data package during preamble, the DFD 322 may perform comparison of frequencies of incoming signal $F_{DATA}$ and clock signal $F_{CLK}$ from the DCO 324, calculate using a control code D and apply it to the DCO 324 thus adjusting generated clock to be in certain ratio to the rate of incoming data. A frequency ratio, M, may be selected as:

$$M = F_{CLK}/F_{DATA} \quad [1]$$

for defining generated clock frequency when DFLL is locked to incoming data rate.

Another design parameter may be bit-width of DCO control data N, which may be selected to be large enough to guarantee a tuning range and minimal frequency step to cover specified data rate range of incoming data and length of the transmitted data package. The relation between frequency of the DCO clock $F_{CLK}$ and control data D may be named DCO transfer function and in case of linear control law may be expressed as:

$$F_{CLK} = F_{MIN} + D*dF, \quad [2]$$

where dF is frequency increment for one step change of the control code D. Frequency control range may be expressed as:

$$F_{MAX} - F_{MIN} = dF*(2^N - 1). \quad [3]$$

The algorithm implemented in the DFD 322 may be initiated at the beginning of each data transmission. As soon as the DFD 322 detects a leading edge of the first bit, it may start counting $F_{CLK}$ pulses in accumulation register Ai. Accumulation may continue for the duration of comparison cycle that is equal to the transmission time of two bits and at the end of comparison cycle, it may calculate new control value, $D_{i+1}$, which may be expressed as:

$$D_{i+1} = D_i - (Ai/M - 1)*2^N. \quad [4]$$

The DFD algorithm may also include initialization, various protections from over-and underflow of internal counters, time-out for tolerating short data packets and other functions for tolerating other possible abnormal operating conditions. In an exemplary implementation for controlling ultrasonic distance measurement sensor using power-line communication protocol, three leading pulses with about 50% duty cycle in the beginning of each data transaction may be adequate for the DFLL to lock internal clock to external data rate. Control algorithm may also be implemented as a Finite State Machine (FSM). An example value for ratio M may be 128 and control code width N=9 bit.

Figure 4:
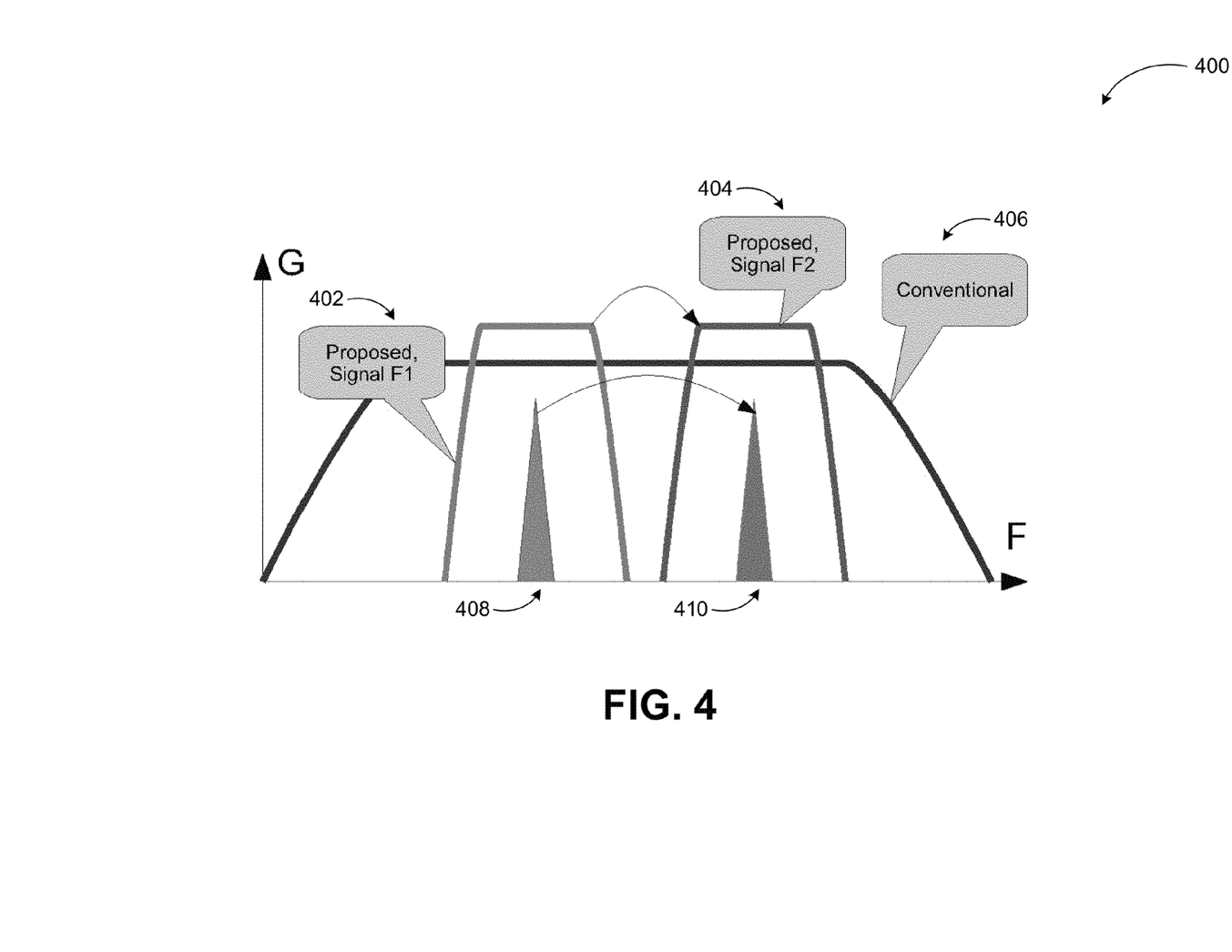
FIG. 4 illustrates a comparison of conventional amplifier frequency response in a SONAR sensor application and the amplifier frequency response of a DFLL according to embodiments.

FIG. 4 illustrates a comparison of conventional amplifier frequency response in a SONAR sensor application and the amplifier frequency response of a DFLL according to embodiments. Exemplary frequency responses of conventional and proposed filters for two different transmitted frequencies are shown in diagram 400.

Analog SONAR sensor systems usually employ signal filtering for improving signal detection ability by limiting the amount of interference from other signals with frequencies higher or lower than the frequency of the signal (408, 410) that is transmitted by the sensor. Conventional sensors have fixed upper and lower limits of the frequency band 406. In order to be able to work with a variety of transducers, such sensors tend to have a relatively wide frequency band.

A system according to embodiments employs a filter with narrow pass-band (402, 404) with improved signal selectivity and improved Signal-to-Noise ratio. For allowing use of the same or even wider variety of transducers automatic adjustment of filter's center frequency to the frequency of transmitted signal (408, 410) may be implemented. Automating filter tuning may be enabled by implementing switched capacitors instead or resistors in conventional active or passive RC filter with switching frequency being in a predefined fixed ratio to the frequency generated by DFLL such as:

$$F_{CENTER} = k*F_{CLK}. \quad [5]$$

Figure 5:
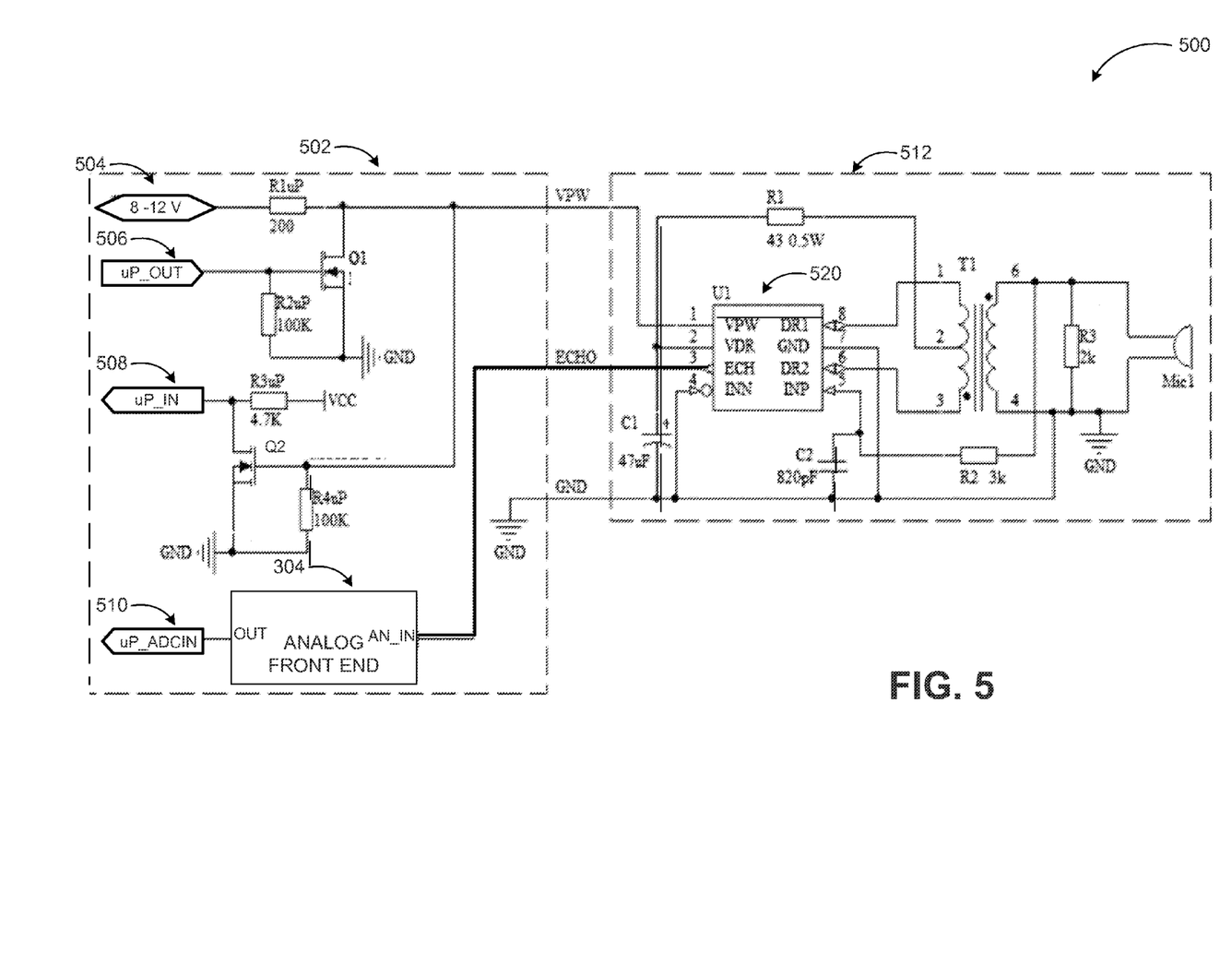
FIG. 5 illustrates a schematic diagram of a SONAR sensor application.

FIG. 5 illustrates a schematic diagram of a SONAR sensor application. The example SONAR sensor application schematic diagram 500 shows an interface between one channel of a controller module 512 and a sensor 502. In the example schematic, components are shown with specific types and values for illustration purposes. However, embodiments are not limited to the specific components, values, and configurations shown in diagram 500. Indeed, a SONAR-based distance measurement system may be implemented with other components and configurations using the principles described herein.

Power may be supplied to the sensor 502 over the VPW line from a DC source 504 (e.g., 8-12 V) through resistor R1. The same line (VPW) may also be used for communicating with the sensor 502. Data from the microcontroller 520 on pin uP_OUT 506 may be transmitted to the sensor using an open-drain driver Q1 and received on uP_IN pin 508 through transistor Q2, which isolates the micro-controller's input from the high voltages present on the VPW line.

The controller may initiate a normal ping-echo cycle by sending a train of pulses over the VPW line to the sensor 502, which in turn may drive the transducer through transformer T1 by applying opposite phase non-overlapping pulses through open drain power drivers at pins DR1 and DR2. After a burst of acoustic waves (a "ping") has been generated by the transducer, the integrated circuit 520 may activate its receiving channel to sense the signal at the transducer, through resistor R2 at pin INP. Since the signal induced by reflected acoustic waves from distant objects may be very small—in the range of ten microvolts or lower—the sensing path may be designed to have a low intrinsic noise level and sub-microvolt compensation for DC offsets caused by normal process variation.

The integrated circuit 520 may transmit the amplified and filtered echo signal to a controller board over a separate ECH wire, where the signal may be accepted by an analog front-end, which may include additional amplifiers and/or filters, a rectifier, and a comparator for generating digital signals acceptable by the micro-controller.

The distance, d, to a reflective surface can be determined from the delay $t_D$ between a transmitted ping and its echo. The distance may be obtained by multiplying the speed of sound $V_S$ in the medium by the delay time, and dividing by two to account for the fact that sound traverses the distance twice (to the target and back again):

$$d = V_S * (t_D/2). \quad [6]$$

The sensing phase of a normal cycle may last up to 32 ms in some practical implementations, and may be limited by an internal time-out counter in order to save power between pings. The gain of the amplifier may be controlled digitally and preset during calibration in a well-controlled acoustic environment at the sensor manufacturer's facility or similar location and stored in internal rewritable non-volatile memory (e.g., EEPROM). In addition, the integrated circuit 520 may enable temporary override of the pre-programmed gain settings for any ping-echo cycle, giving additional flexibility to the users.

The number of pulses in a ping may vary from 4 to 32 in some practical implementations, and the frequency may range from about 35 kHz to about 68 kHz. Internal circuitry may also implement de-glitching and suppress single short or long pulses and other disturbances that may appear on the VPW line in severe manufacturing or automotive environments.

The selection of values for external components to the integrated circuit 520 may be based on specific use requirements. Maximum measurable distance and the accuracy of distance measurements present competing requirements that may lead to trade-offs suited to the particular applications. In selecting a piezoelectric transducer, consideration may be given to the fact that such elements tend to have a sharp mechanical resonance that provides maximum performance in a relatively narrow frequency range. Higher operating frequencies typically allow more accurate measurement, but in a narrower detection range.

Because the magnitude of the echo signal reduces with distance, the maximal detection range may be determined by the amount of transmitted energy and the noise level at the sense node. A suitable measure of the amount of transmitted energy is the product of the number of pulses and the peak voltage achieved in the transducer during the excitation phase. Capacitor C1 is an energy storage reservoir that allows for maintaining a DC supply during each excitation phase, despite the modulation of the power line VPW. Selecting a combination of R1 and C1 to ensure an adequate DC supply, the combination may satisfy the following inequality:

$$R1 * C1 \geq (V_{DR} * N)/(dV * F), \quad [7]$$

where VDR is the DC voltage at the VDR pin in the idle condition, N is the number of pulses in a ping, dV is the acceptable voltage drop, R1 is the value of R1, and F is the ping frequency.

Once the transducer is excited it may continue to oscillate after the termination of the excitation, due to its resonant nature. Resistors R2 and R3 reduce the duration of the decay stage: lower resistance results in faster decay and a lower noise level during the sensing phase. However, the resistors also suppress the amplitude of the driving signal during excitation. Thus, optimal values for these resistors may be determined experimentally (e.g., within a range from about 1 kΩ to about 5 kΩ) for a selected transformer and transducer. The capacitor C2 at the sensing input INP of the IC 520 may improve the signal-to-noise (SNR) ratio by suppressing out-of-band noise. The components C2 and R2 may be selected to provide a low-pass filter with a corner frequency above the optimal operating frequency F of the transducer:

$$R2 * C2 \leq 1/(3\pi * F). \quad [8]$$

Figure 6:
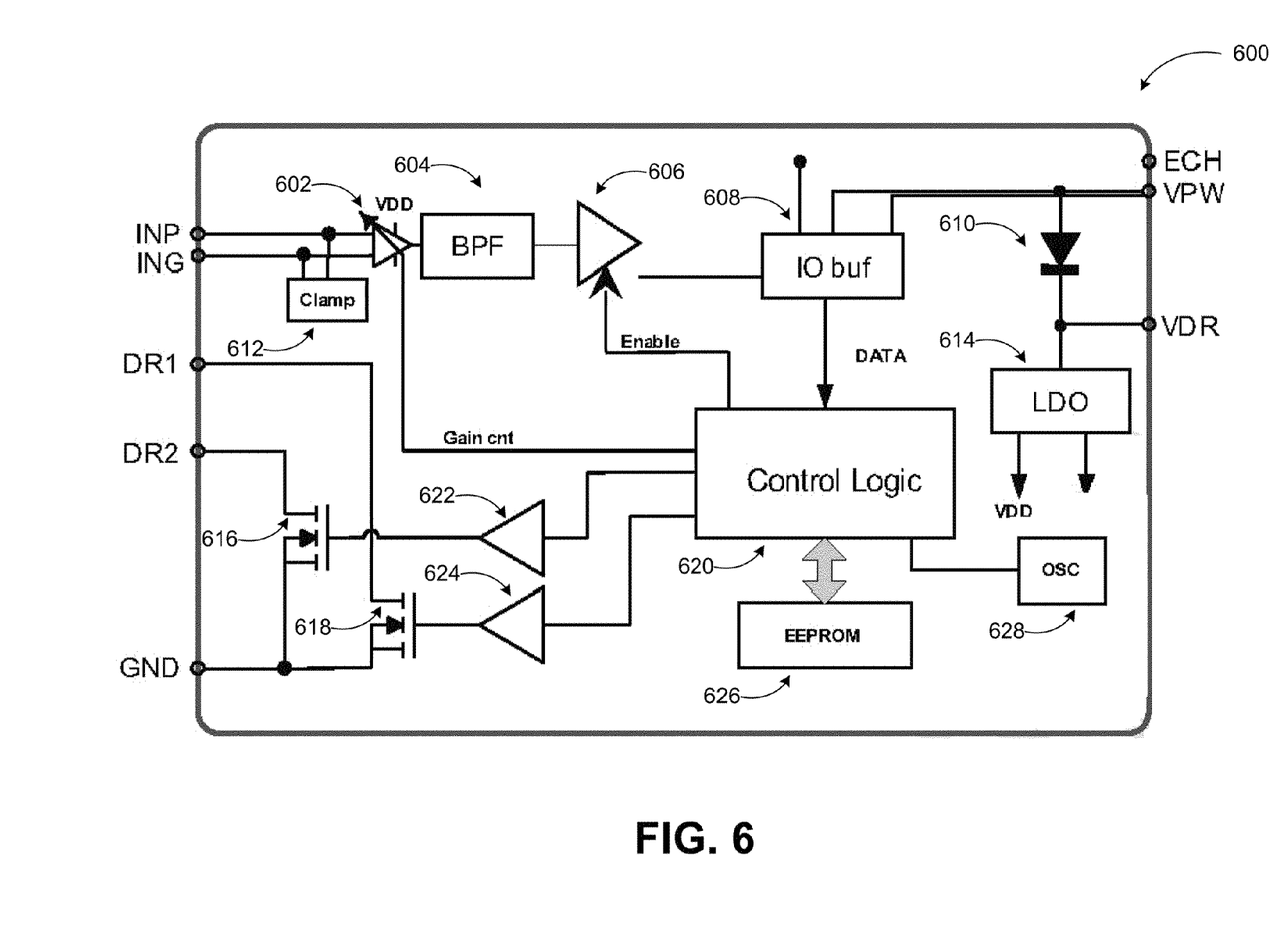
FIG. 6 illustrates a schematic diagram of a controller module for SONAR sensor applications according to embodiments.

FIG. 6 illustrates a schematic diagram of a controller for SONAR sensor applications according to embodiments. The controller in diagram 600 is one implementation of the integrated circuit 520 in diagram 500 of FIG. 5 and is intended to be implemented in ultrasonic distance measurement systems as part of the sensor electronics. The controller includes both transmitting and receiving paths and may be placed close to a piezoelectric transducer. The controller's main functions may include excitation of the transducer for emitting ultrasonic wave and transmission of sensed, amplified, and filtered signal from the transducer to the controller.

In one configuration the controller may need only two wires to receive power, receive command from, and transmit echo signal to controller board substantially reducing a number of components in the overall system and enabling digital gain control of the sense amplifier. Digital gain settings may be stored in an internal rewritable non-volatile memory allowing automated calibration of assembled sensors at manufacturer's facility in well-controlled acoustic environment.

Block diagram 600 of the controller includes a diode 610 between VPW and VDR pins; IO buffers 608 for receiving and transmitting commands and data over the power line on VPW pin; digital control logic 620, an oscillator 628 with DFLL, an EEPROM 626 for storing calibration values, two open drain drivers (616, 618) connected to DR1 and DR2 pins; and a sense amplifier 606 with programmable gain 602 and band pass filter (BPF) 604.

After applying power, the controller may reset its internal digital logic (620), read amplifier gain setting from the EEPROM 626 to a gain register, and turn into an idle mode waiting for a command from the system. The command is a series of negative pulses on the power line (VPW). With a first negative edge detected, the controller may start a ping-echo cycle: it may activate power drivers 616, 618 (through 622 and 624) so that they generate alternative current in a primary winding of the transformer connected to these drivers in a primary winding of the transformer connected to these drivers. Secondary winding of the transformer is connected to ultrasonic piezoelectric transducer, which emits a burst of ultrasound waves formed in a beam (a ping). If an obstacle is present inside the beam, the waves reflect from the object and propagate back to the transducer, which converts the acoustic energy of the echo into an electrical signal.

The electrical signal from the transducer is delivered to the sense inputs of the controller, where it is amplified, filtered, and transmitted to the system, which may compute the distance of the obstacle through the time delay between the ping and the echo. A gain of the amplifier 606 may be programmable. Desired gain level may be determined in a controlled calibration process and stored in the EEPROM 626 or similar non-volatile memory.

The controller may provide sensed and amplified response on the ECH output. Alternatively, the response may also be provided to the system via the power line of the controller, in which case the ECH output may be coupled to the power connection through a capacitor. Diode 610 may be used to isolate power line from energy storage during communication.

A controller according to embodiments may support a number of operational modes. Some example operation modes may include: normal ping-echo cycle; ping-echo cycle with a temporary (one-cycle) custom gain value; EEPROM read (no ping generation and no echo sensing); and EEPROM write (no ping generation and no echo sensing). One way to manage the controller may be by "bit-banging" the PWR line using a bit rate that is double the desired ping frequency. A normal ping-echo cycle can be generated by sending an alternating sequence of bits such as '01010101 . . . ' with two bits per pulse; the number of bits is twice the desired number of pulses in the ping. The one-cycle ping with a custom gain setting may be useful for efficient automated calibration, since a series of pings can be issued in rapid succession with a different gain for each ping. It may also provide the option of designing adaptive algorithms to be applied in the end-user application, offering improved range and accuracy as compared to a fixed-gain implementation.

During the gain setting ping-echo cycle mode, gain setting data may be loaded into a gain controller register and used for setting amplifier gain in current measurement cycle. The EEPROM writing mode may be initiated with verification of a password code, followed by erasure of the EEPROM and writing of the gain setting data into the EEPROM. Ping may be terminated and amplifier may be in an OFF state during the EEPROM writing mode. Successful completion of the EEPROM writing cycle may be indicated by an acknowledge pulse generated by the controller on the VPW line. The EEPROM read mode may also include termination of ping generation and storage of the read data from the EEPROM into the amplifier gain register.

While embodiments have been discussed above using specific examples, components, and configurations in FIGS. 1 through 6, they are intended to provide a general guideline to be used for enabling an integrated circuit serving as the basis of SONAR sensors employing a DFLL and using the power line for communication. These examples do not constitute a limitation on the embodiments, which may be implemented using other components, modules, and configurations using the principles described herein. For example, any suitable components may replace those in the schematic diagrams representing example embodiments. Furthermore, actions discussed above may be performed in various orders, especially in an interlaced fashion.

There is little distinction left between hardware and software implementations of aspects of systems; the use of hardware or software is generally (but not always, in that in certain contexts the choice between hardware and software may become significant) a design choice representing cost vs. efficiency tradeoffs. There are various vehicles by which processes and/or systems and/or other technologies described herein may be effected (e.g., hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; if flexibility is paramount, the implementer may opt for a mainly software implementation; or, yet again alternatively, the implementer may opt for some combination of hardware, software, and/or firmware.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples may be implemented, individually and/or collectively, by a wide range of hardware, software, firmware, or virtually any combination thereof In one embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, may be equivalently implemented in integrated circuits, as one or more computer programs running on one or more computers (e.g., as one or more programs running on one or more computer systems), as one or more programs running on one or more processors (e.g. as one or more programs running on one or more microprocessors), as firmware, or as virtually any combination thereof, and that designing the circuitry and/or writing the code for the software and or firmware would be well within the skill of one of skill in the art in light of this disclosure.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds compositions or biological systems, which can, of course, vary. It is also to be understood that the terminology used herein is for the purpose of describing particular embodiments only, and is not intended to be limiting.

In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a Compact Disc (CD), a Digital Versatile Disk (DVD), a digital tape, a computer memory, etc.; and a transmission type medium such as a digital and/or an analog communication medium (e.g., a fiber optic cable, a waveguide, a wired communications link, a wireless communication link, etc.).

Those skilled in the art will recognize that it is common within the art to describe devices and/or processes in the fashion set forth herein, and thereafter use engineering practices to integrate such described devices and/or processes into data processing systems. That is, at least a portion of the devices and/or processes described herein may be integrated into a data processing system via a reasonable amount of experimentation. Those having skill in the art will recognize that a typical data processing system generally includes one or more of a system unit housing, a video display device, a memory such as volatile and non-volatile memory, processors such as microprocessors and digital signal processors, computational entities such as operating systems, drivers, graphical user interfaces, and applications programs, one or more interaction devices, such as a touch pad or screen, and/or control systems including feedback loops and control motors (e.g., feedback for sensing position and/or velocity of gantry systems; control motors for moving and/or adjusting components and/or quantities).

A typical data processing system may be implemented utilizing any suitable commercially available components, such as those typically found in data computing/communication and/or network computing/communication systems. The herein described subject matter sometimes illustrates different components contained within, or connected with, different other components. It is to be understood that such depicted architectures are merely exemplary, and that in fact many other architectures may be implemented which achieve the same functionality. In a conceptual sense, any arrangement of components to achieve the same functionality is effectively "associated" such that the desired functionality is achieved. Hence, any two components herein combined to achieve a particular functionality may be seen as "associated with" each other such that the desired functionality is achieved, irrespective of architectures or intermediate components. Likewise, any two components so associated may also be viewed as being "operably connected", or "operably coupled", to each other to achieve the desired functionality, and any two components capable of being so associated may also be viewed as being "operably couplable", to each other to achieve the desired functionality. Specific examples of operably couplable include but are not limited to physically connectable and/or physically interacting components and/or wirelessly interactable and/or wirelessly interacting components and/or logically interacting and/or logically interactable components.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations).

Furthermore, in those instances where a convention analogous to "at least one of A, B, and C, etc." is used, in general such a construction is intended in the sense one having skill in the art would understand the convention (e.g., " a system having at least one of A, B, and C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," "greater than," "less than," and the like include the number recited and refer to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. A controller for ultrasonic echo based distance measurement systems, the controller comprising:
   a pair of transmitting power drivers for activating a piezoelectric transducer;
   a receiving sense path;
   a digital frequency locked loop (DFLL) for adjusting an internal clock frequency based on a rate of incoming external data flow; and
   an amplifier with a digital gain control.

2. The controller according to claim 1, further comprising a digital communication interface for receiving and transmitting gain setting data from and to an ultrasonic echo based distance measurement system.

3. The controller according to claim 2, wherein digital communication interface is configured to communicate with the ultrasonic echo based distance measurement system through a power line of the controller.

4. The controller according to claim 1, wherein the DFLL includes at least one from a set of: a Digital Frequency Differentiator (DFD), a Digitally-Controlled Oscillator, and a Frequency Divider (FD).

5. The controller according to claim 4, wherein the DFD is configured to perform a comparison of frequencies of an incoming signal, $F_{DATA}$, and a clock signal, $F_{CLK}$, from the DCO at a start of each data package during a preamble, calculate a control code, and apply the control code to the DCO to adjust the clock signal to a predefined ratio to a rate of incoming data.

6. The controller according to claim 5, wherein the predefined ratio, M, is $M=F_{CLK}/F_{DATA}$.

7. The controller according to claim 1, configured to:
initiate a ping-echo cycle by transmitting a train of pulses over a power line of the controller to a sensor to drive a transducer;
after a burst of acoustic waves is generated by the transducer, activate the receiving sense path in order to sense a received signal at the transducer;
amplify and filter the sensed signal; and
transmit the amplified and filtered signal to the ultrasonic echo based distance measurement system through one of the power line of the controller and a separate signal output.

8. The controller according to claim 7, wherein the transducer is driven through a transformer by applying opposite-phase non-overlapping pulses through the pair of open drain power drivers.

9. The controller according to claim 1, further comprising a non-volatile memory circuit for storing amplifier gain data generated during a calibration process.

10. The controller according to claim 1, further configured to enable a temporary override of pre-programmed amplifier gain settings for a ping-echo cycle.

11. The controller according to claim 1, further configured to enable at least one of de-glitching and suppression of single short and long pulses appearing on the power line.

12. An ultrasonic echo based distance measurement system, comprising:
a piezoelectric transducer configured to transmit acoustic waves in response to an electrical signal and generate another electrical signal in response to a detected acoustic wave; and
a controller comprising a pair of transmitting power drivers for activating a piezoelectric transducer to transmit the acoustic waves in response to receiving a command, a receiving sense path, a digital frequency locked loop (DFLL) for adjusting an internal clock frequency based on a rate of incoming external data flow, and an amplifier with a digital gain control, wherein the controller is configured to:
initiate a ping-echo cycle by transmitting a train of pulses over a power line of the controller to the transducer;
after a burst of acoustic waves is generated by the transducer, activate the receiving sense path in order to sense the other electrical signal based on the detected acoustic wave at the transducer;
amplify and filter the other electrical signal; and
transmit the amplified and filtered electrical signal to a microcontroller of the ultrasonic echo based distance measurement system through one of the power line of the controller and a separate signal output.

13. The ultrasonic echo based distance measurement system according to claim 12, wherein the controller is further configured to:
in response to detecting a leading edge of a first bit, start counting internally generated clock pulses in an accumulation register, Ai;
continue accumulating for a duration of a comparison cycle that is substantially equal to a transmission time of two bits; and
at the end of comparison cycle, calculate a control value, $D_{i+1}$.

14. The ultrasonic echo based distance measurement system according to claim 13, wherein the control value, $D_{i+1}$, is computed iteratively based on a previous control value, $D_i$, as:
$D_{i+1}=D_i-(Ai/M-1)*2^N$, where Ai is a number of the internally generated clock pulses accumulated in the accumulation register, M is a predefined ratio of the internally generated clock pulses to a rate of incoming data, and N is a number of the bits.

15. The ultrasonic echo based distance measurement system according to claim 12, wherein the controller is further configured to perform at least one from a set of:
an initialization;
one or more protections from over-and underflow of internal counters; and
a time-out for tolerating short data packets.

16. The ultrasonic echo based distance measurement system according to claim 12, wherein the controller further includes a tunable narrow band-pass filter for improving signal-to-noise ratio with a center frequency, $F_{CENTER}$, defined based on an internal clock frequency, $F_{CLK}$, as: $F_{CENTER}=k*F_{CLK}$, where k is a predefined integer.

17. A method for ultrasonic echo based distance measurement, the method comprising:
receiving a command to transmit acoustic waves at a controller;
initiating a ping-echo cycle by transmitting a train of pulses over a power line of the controller to a transducer;
after a burst of acoustic waves is generated by the transducer, activating a receiving sense path of the controller in order to sense an electrical signal based on a detected acoustic wave at the transducer;
amplifying the sensed signal at a digitally programmable amplifier of the controller;
filtering the amplified signal at a tunable narrow band-pass filter of the controller; and
transmitting the filtered signal to a microcontroller of a ultrasonic echo based distance measurement system through one of the power line of the controller and a separate signal output.

18. The method according to claim 17, further comprising:
executing a control algorithm to perform an initialization, one or more protections from over-and underflow of internal counters, and a time-out for tolerating short data packets.

19. The method according to claim 18, wherein the control algorithm is implemented as a Finite State Machine (FSM).

20. The method according to claim 17, further comprising:
during a gain setting ping-echo cycle mode, loading gain setting data into a gain controller register, and setting amplifier gain in a current measurement cycle based on the loaded gain setting data; and during an EEPROM writing mode verifying a password code, erasing an EEPROM of the controller, writing the gain setting data into the EEPROM, and indicating a successful completion of the EEPROM writing cycle by an acknowledge pulse generated by the controller on a power line of the controller.

* * * * *